3,189,520
FUNGICIDAL PHENYLSYDNONES

Edward F. Rogers, Middletown, N.J., and David Davis, Brooklyn, N.Y., assignors to Merck & Co., Inc., Rahway, N.J., a corporation of New Jersey
No Drawing. Filed July 9, 1956, Ser. No. 596,399
2 Claims. (Cl. 167—33)

This invention relates to fungicidal compositions and particularly to a preparation useful against cereal rusts and rusts of broad leaf plants. The invention also involves the method of combatting these diseases.

Rusts are very destructive diseases of many plants, for example, leaf rust of wheat and bean rust fungus diseases which are caused by the fungi known as *Puccinia rubigo veva* and *Uromyces phaseoli*, respectively. They are so destructive in their action that the time and money which the farmer puts into the planting and cultivation of wheat, beans, and other crops is frequently lost, either in part or in whole. An effective way to check the ravages of these diseases has been sought for a long time.

Wheat rust is especially harmful to durum wheat which is principally used in the production of spaghetti and similar edible foods. In recent years the disease has become so widespread that it is now recognized as one of our most serious agricultural problems.

No entirely satisfactory treatment against the rusts exists at the present time. The fungicidal agents which are available are either so costly or exert such a harmful action themselves that they have not been acceptable.

The present invention involves the discovery that the application of certain sydnones to these plants constitutes an effective treatment. The chemicals may be applied to the plants as a preventive measure to prevent the growth of the fungi. Even more important is the fact that the chemical may be applied to plants which are already infected with the disease in order to bring about its eradication. This latter use is advantageous because the farmer is not required to indiscriminately apply the chemical to all plants irrespective of whether or not it may later prove to have been not needed.

The active ingredients of the invention are phenylsydnones having the following structure:

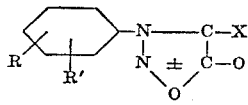

In this compound R may be hydrogen, chlorine or bromine, R' may be hydrogen, chlorine or bromine and X may be hydrogen, bromine, chlorine or a lower alkyl radical.

The compound to be used from this group may be applied to the plants in any conventional manner. It may be dusted directly on the plant as a powder, but inasmuch as a very minute amount is effective against the fungi, it ordinarily will be preferable to reduce the concentration of the active ingredient by mixing it with a relatively large amount of a carrier. This carrier may be an inert one such as a clay, or it may be a preparation which itself exerts a beneficial influence upon the plant. The carrier may, as well, be a liquid such as a petroleum distillate or it may be in the form of an aqueous suspension or solution. These liquid preparations are to be sprayed upon the plants to be controlled, or may be applied as drenches or dips.

The compounds of the invention may be prepared by procedures which are known in the art. The N-phenylsydnone may be prepared, for example, by the procedure outlined in an article entitled "The Action of Acetic Anhydride on N-Nitrosophenylglycine and Some of Its Derivatives" by J. C. Earl and A. W. Mackney, J. Chem. Soc. 899 (1935). Further disclosure of its preparation is contained in an article entitled "Further Properties of the Sydnones and the Mechanism of Their Formation" by W. Baker, W. D. Ollis and V. D. Poole, J. Chem. Soc. 1542 (1950).

The N-parachlorophenylsydnone may be prepared by the procedure set forth in an article entitled "The Structure of the Sydnones and Related Compounds" by W. Baker, W. D. Ollis and V. D. Poole, J. Chem. Soc. 307 (1949). A similar procedure may be utilized in preparing the previously unknown N-metachlorophenylsydnone (melting point=138–140° C.) by using metachlorophenylglycine which is then nitrosated and subsequently treated with acetic anhydride as outline, for example, in J. Chem. Soc. 307 (1949). Other reagents such as acetyl chloride, trifluoro acetic anhydride and other cyclizing agents may be used. The metachlorophenylglycine may be prepared by reacting metachloro aniline with chloroacetic acid by using the Strecker reaction which is outlined by Schwalbe, Ber. 41, 3794 (1908).

The N-bromophenylsydnones corresponding to the above chloro compounds are made by starting with the corresponding bromo substituted phenylglycine, for example, as is apparent from the literature. Other N-halophenyl sydnones may be made in a similar manner, and it is to be understood that the selected halogen may be at any position on the phenyl radical.

The dichloro and bromo derivatives may be prepared by following the procedure of the article in J. Chem. Soc. 307 (1949), by starting with the corresponding N-dichloro-, or N-dibromo- phenylglycine which is then nitrosated and cyclized by the use of one of the cyclizing agents known for this purpose. Other dihalophenyl derivatives are similiarly made, and it will be clear from the structure shown above that the selected halogens may be located at any two positions on the phenyl radical.

The previously unknown 2,4 dichlorophenylsydnone was found to have a melting point=98.5–101° C. and the previously unknown 3,4 dichlorophenylsydnone was found to have a melting point=150–151° C.

To substitute bromine or chlorine for the hydrogen at X in the above structural formula the procedure outlined by J. Kenner and K. Mackay in an article entitled "Structure of the Sydnones" in Nature 158, 909 (1946) may be utilized. Substantially the same procedure is set forth in the article appearing in J. Chem. Soc. 307 (1949) supra. However, it has been found that improved results are obtained if the halogenation is conducted in the presence of sodium acetate in addition to acetic acid.

Other C-halogenated derivatives of the monohalogenated and dihalogenated phenyl sydnones, referred to above, are obtained by following similar procedures.

The C-lower alkyl derivatives of the above compounds are obtained by following the procedure set forth in the article in J. Chem. Soc. 899 (1935) supra. These lower alkyl radicals may contain from one up to four or five carbon atoms.

As has been mentioned above, one or more of these compounds may be applied to the wheat or bean plants to be treated, but because of their strong fungicidal acitvity it is best to mix them with a carrier and to apply the diluted mixture. The preparation to be applied to the plant may contain from 100 to 4000 parts by weight per million. It is convenient to prepare a concentrate of the sydnone containing 10 to 70% of the active ingredient dispersed in a carrier such as clay and a wetting or sticking agent. This may be dissolved or dispersed in water to give the desired final plant spray.

The active material is distributed over the plants to be treated in the range of from 0.04 to 80 pounds per acre, but the application of from 0.10 to 4 pounds per acre will be found to be the best range.

The effectivenes of various concentrations of representative ones of the compounds, against rusts, is shown in the Table I below:

TABLE I

*Effectiveness of sydnones in controlling plant rusts*

| Compound | Percent reduction in wheat rust | Percent reduction in bean rust |
|---|---|---|
| N-phenylsydnone: | | |
| 1,000 p.p.m. | 79 | 100 |
| 500 p.p.m. | 42 | |
| 250 p.p.m. | 25 | 100 |
| N-p-chlorophenylsydnone: | | |
| 1,000 p.p.m. | 92 | 92 |
| 500 p.p.m. | 79 | |
| 250 p.p.m. | 50 | |
| C-bromo-N-phenylsydnone: | | |
| 1,000 p.p.m. | 42 | 100 |
| 500 p.p.m. | | 100 |
| 250 p.p.m. | | 85 |
| 125 p.p.m. | | 63 |
| N-2,4-dichlorophenylsydnone: | | |
| 1,000 p.p.m. | 67 | |
| 500 p.p.m. | | 100 |
| 250 p.p.m. | | 96 |
| N-3,4-dichlorophenylsydnone: 1,000 p.p.m. | 58 | 28 |
| N-M-chlorophenylsydnone: | | |
| 1,000 p.p.m. | 94 | 99 |
| 500 p.p.m. | 92 | 82 |
| 250 p.p.m. | 79 | |
| C-methyl-N-phenylsydnone: | | |
| 1,000 p.p.m. | 0 | |
| 500 p.p.m. | | 92 |
| 250 p.p.m. | | 71 |
| C-chloro-N-phenylsydnone: | | |
| 500 p.p.m. | | 100 |
| 250 p.p.m. | | 90 |
| 125 p.p.m. | | 75 |

In carrying out these tests it is important to note that the plants were uniformly infected with a virulent strain of rust. Three days later, or when the infection had become firmly established, the chemical was applied as a spray. After an additional seven days comparative disease readings were taken on the treated and untreated plots. A reading of 100% means that no erupted dust pustules were evident and a reading of 90% means that the treated plants had only 10% of the number of lesions that the control plot (untreated) did.

Suitable formulations containing the active ingredients of the invention are the following:

EXAMPLE 1

1 lb. of N-p-chlorophenylsydnone previously milled or otherwise reduced to a particle size of less than 10–15 microns (average) is added to 1000 lbs. of diatomaceous earth and this is thoroughly mixed. The resulting preparation is suitable for application to 25 acres of a wheat field.

The invention also contemplates the addition of as small an amount as 1/10 lb., or as large an amount as 2000 lbs. of the active material for each 1000 lbs. of the inert carrier. The more concentrated forms are useful as concentrates to be diluted further with water or other carrier just prior to use. The more dilute forms are useful directly as dusts.

EXAMPLE 2

A solution of C-bromo-N-phenylsydnone is acetone or dimethyl formamide was prepared. To this was added 1% of a wetting agent, e.g., Tween 20, based on the sydnone. This concentrate was quenched in a volume of water with agitation such that a stable, fine suspension of C-bromo-N-phenylsydnone at a level of 500 p.p.m. was obtained.

EXAMPLE 3

The standard test was run on bean plants infected with rust and using the C-bromophenylsydnone as an eradicant at 1000 p.p.m. Ten days after inoculation with the disease (seven days after the chemical was applied) there was substantially no evidence of disease, whereas the control plants were heavily infected.

The treated plants were then covered with an inoculum of bean rust spores but *no further chemical treatment was made*. Aften ten days, all leaves which had been sprayed originally with C-bromophenylsydnone were almost free of pustules. The newly formed leaves, which had not been protected originally but which had been infected with the second rust inoculation, were heavily infected with rust. This shows the remarkable persistence of the effect of the sydnones.

Although the invention has been disclosed with especial reference to wheat rust and bean rust inasmuch as the ravages of these diseases are a foremost agricultural problem at this time, the invention contemplates the use of the phenylsydnones to combat other plant diseases due particularly to the fungi above referred to.

What is claimed is:

1. The method of combatting plant fungi which comprises applying to the plant fungi a phenylsydnone having the following structure:

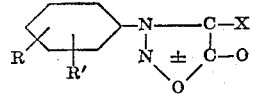

in which R is selected from the group consisting of hydrogen, chlorine and bromine, R' is selected from the group consisting of hydrogen, chlorine and bromine, and X is selected from the group consisting of hydrogen, chlorine, bromine and lower alkyl in the amount of from 0.04 to 80 pounds per acre.

2. The method of combatting plant fungi which comprises applying to the plant fungi a composition consisting of a carrier and a phenylsydnone having the following structure:

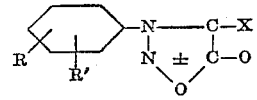

in which R is selected from the group consisting of hydrogen, chlorine and bromine, R' is selected from the group consisting of hydrogen, chlorine and bromine, and X is selected from the group consisting of hydrogen, chlorine, bromine and lower alkyl, the phenylsydnone being present in the ratio of from 100 to 4000 parts per million, the composition being applied to distribute from 0.04 to 80 pounds of the phenylsydnone per acre.

References Cited by the Examiner

FOREIGN PATENTS 740,213   8/43   Germany.

OTHER REFERENCES

Baker et al.: J. Chem. Soc. (London), vol. 1949, pp. 307–314.

Baker et al.: J. Chem. Soc. (London), vol. 150, pp. 1542–51.

Earl et al.: J. Chem. Soc. (London), vol. 1935, pp. 899–900.

Hill: J. Chem. Soc., vol. 1953, pp. 1482–90.

Schmidt: Chemical Abstracts, vol. 46, col. 2871 (1952).

JULIAN S. LEVITT, *Primary Examiner*.

H. SURLE, MORRIS O. WOLK, WILLIAM B. KNIGHT, *Examiners*.